United States Patent [19]

Chang et al.

[11] Patent Number: 5,478,916
[45] Date of Patent: * Dec. 26, 1995

[54] SOLVENT RESISTANT COPOLYIMIDE

[75] Inventors: Alice C. Chang, Yorktown; Terry L. St. Clair, Poquoson, both of Va.

[73] Assignee: The United States of America as represented by the Administrator of the National Aeronautics and Space Administration, Washington, D.C.

[*] Notice: The portion of the term of this patent subsequent to Nov. 7, 2012, has been disclaimed.

[21] Appl. No.: 299,384

[22] Filed: Sep. 1, 1994

[51] Int. Cl.$^6$ .................... C08G 73/10; C08G 69/26
[52] U.S. Cl. .................... 528/353; 528/125; 528/126; 528/128; 528/172; 528/173; 528/179; 528/183; 528/185; 528/188; 528/220; 528/229; 528/350; 528/351; 526/935; 428/411.1; 428/473.5
[58] Field of Search .................... 528/188, 125, 528/128, 126, 172, 173, 179, 183, 185, 220, 229, 350, 351, 353; 526/935; 428/478.5, 411.1

[56] References Cited

U.S. PATENT DOCUMENTS 4,640,972  2/1987  Irwin ........................ 528/188
5,147,966  9/1992  St. Clair et al. ........................ 528/188

FOREIGN PATENT DOCUMENTS

0459801A2  5/1991  European Pat. Off. .

OTHER PUBLICATIONS

D. J. Progar and T. L. St. Clair, "A new flexible backbone polyimide adhesive", *J. Adhesion Sci. Technol.*, vol. 4, No. 7, pp. 527–549 (1990).

*Primary Examiner*—P. Hampton-Hightower
*Attorney, Agent, or Firm*—George F. Helfrich; Joy L. Bryant

[57] ABSTRACT

A solvent resistant copolyimide was prepared by reacting 4,4'-oxydiphthalic anhydride with a diamine blend comprising, based on the total amount of the diamine blend, about 75 to 90 mole percent of 3,4'-oxydianiline and about 10 to 25 mole percent p-phenylene diamine. The solvent resistant copolyimide had a higher glass transition temperature when cured at 350°, 371° and 400° C. than LaRC™-IA. The composite prepared from the copolyimide had similar mechanical properties to LaRC™-IA. Films prepared from the copolyimide were resistant to immediate breakage when exposed to solvents such as dimethylacetamide and chloroform. The adhesive properties of the copolyimide were maintained even after testing at 23°, 150°, 177° and 204° C.

16 Claims, No Drawings

5,478,916

SOLVENT RESISTANT COPOLYIMIDE

ORIGIN OF THE INVENTION

The invention described herein was jointly made by an employee of the United States Government and in the performance of work under a NASA Contract and is subject to the provisions of Section 305 of the National Aeronautics and Space Act of 1958, as amended Public Law 85-568 (72 Stat. 435; 42 U.S.C. 2457).

CROSS-REFERENCE TO RELATED APPLICATIONS

This application is related to co-pending patent application Ser. No. 08/299,172, filed Aug. 31, 1994, entitled "Copolyimides prepared from ODPA, BTDA and 3,4'-ODA" and co-pending patent application Ser. No. 08/299,385, filed Sep. 1, 1994, entitled "A Direct Process for Preparing SemiCrystalline Polyimides".

BACKGROUND OF THE INVENTION

1. Field of the Invention

The present invention relates to copolyimides. In particular, it relates to copolyimides prepared from 4,4'-oxydiphthalic anhydride, 3,4'-oxydianiline, and p-phenylene diamine.

2. Description of the Related Art

High performance polyimides are rapidly finding new uses as matrix resins for composites, moldings and films in addition to their traditional use as adhesives. Since these materials display a number of performance characteristics such as high temperature and solvent resistance, improved flow for better wetting and bonding, high modulus, and chemical and hot water resistance, they are useful for the manufacture of lighter and stronger aircraft and spacecraft structures.

One example of this type of polyimide is that prepared by St. Clair et al. in "Polyimide Molding Powder, Coating, Adhesive and Matrix Resin", U.S. Pat. No. 5,147,966. This particular polyimide, referred to hereafter as LaRC™-IA, exhibits excellent thermooxidative stability and is melt processable at temperatures ranging from 325°–350° C. LaRC™-IA has a melt temperature (Tm) of 295.2° C., an enthalpy of 33.2 J/g and a glass transition temperature (Tg) of 229.6° C. As a result of these properties, this polymer has shown potential use for molded parts, films, tubing, aircraft wiring insulation and as a matrix resin for a composite. Unfortunately, it is not resistant to solvent when the polymer is subjected to stress.

Tamai et al. (European Patent Application number 91304893.0) also prepared LaRC™-IA along with several other readily processable polyimides and copolyimides. An example of one such copolyimide is that prepared from 3,4'-diaminodiphenyl ether (3,4'-ODA), 4,4'-oxydiphthalic anhydride (ODPA) and pyromellitic dianhydride (PMDA), which has the repeat units:

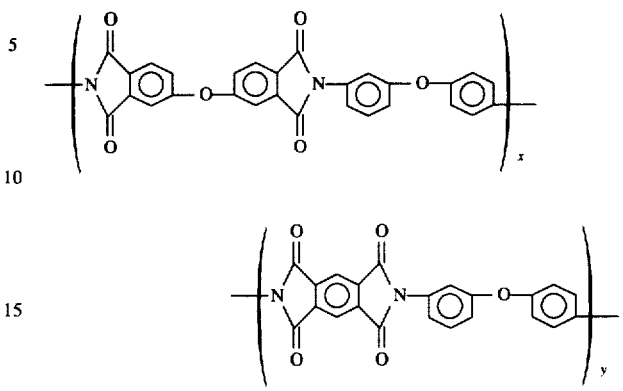

Some of these polyimides exhibited excellent processability, good chemical resistance and outstanding transparency in addition to excellent heat resistance. However, none of the polyimides were subjected to solvent under stress. Rather, they were tested as powders.

An object of the present invention is to prepare a copolyimide which is resistant to solvent when subjected to stress.

Another object of the invention is to prepare a solvent resistant copolyimide by mixing a diamine blend with a dianhydride.

Another object of the invention is to prepare composites, films and adhesives from the solvent resistant copolyimide.

SUMMARY OF THE INVENTION

The foregoing and additional objects of the invention were obtained by preparing a solvent resistant copolyimide by reacting 4,4'-oxydiphthalic anhydride (ODPA) with a diamine blend comprising, based on the total amount of the diamine blend, about 75 to 90 mole percent of 3,4'-oxydianiline (3,4'-ODA) and about 10 to 25 mole percent of p-phenylene diamine (p-PDA). The resulting copolyimide has the repeat units:

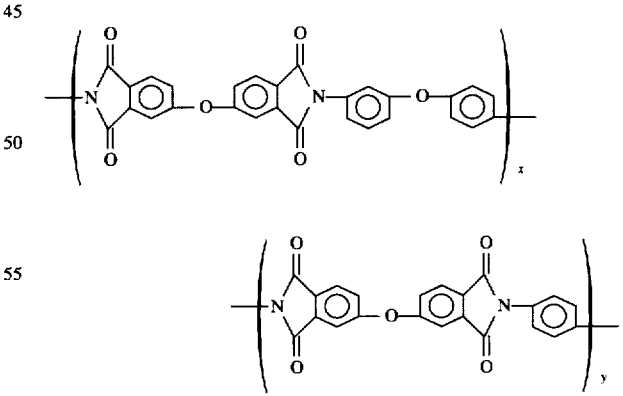

wherein x is 75 to 90 mole percent of the copolyimide and y is 10 to 25 mole percent of the copolyimide.

The copolyimide may be endcapped with up to about 10 mole percent of a monofunctional aromatic anhydride and has unbalanced stoichiometry such that a molar deficit in the 4,4'-oxydiphthalic anhydride is compensated with twice the molar amount of the monofunctional aromatic anhydride.

The solvent resistant copolyimide was used to prepare composites which had similar properties to LaRC™-IA. Films prepared from the copolyimide were found to be resistant to immediate breakage when exposed to solvents such as dimethylacetamide (DMAc) and chloroform. The adhesive properties of the copolyimide were maintained even after testing at 23°, 150°, 177° and 204° C.

DESCRIPTION OF THE PREFERRED EMBODIMENTS

By the present invention, a solvent resistant copolyimide was prepared by reacting 4,4'-oxydiphthalic anhydride (ODPA) with a diamine blend. The diamine blend comprises, based on the total amount of the diamine blend, about 75 to 90 mole percent of 3,4'-oxydianiline (3,4'-ODA) and about 10 to 25 mole percent of p-phenylene diamine (p-PDA). In a preferred embodiment of the invention, the diamine blend comprises, based on the total amount of the diamine blend, 90 mole percent of 3,4'-oxydianiline and 10 mole percent of p-phenylene diamine.

The copolyimide may be endcapped with up to about 10 mole percent of a monofunctional aromatic anhydride and have unbalanced stoichiometry such that a molar deficit in 4,4'-oxydiphthalic anhydride is compensated with twice the molar amount of the monofunctional aromatic anhydride. For the present invention, the preferred monofunctional aromatic anhydride is phthalic anhydride. In a preferred embodiment, the unbalanced stoichiometry is such that a 2.5 to 5.0 percent molar deficit exists for 4,4'-oxydiphthalic anhydride and 5.0 to 10.0 mole percent of phthalic anhydride is used as an endcapper. In a most preferred embodiment the copolyimide is prepared from 4,4'-oxydiphthalic anhydride and a diamine blend, comprising 90 mole percent of 3,4'-oxydianiline and 10 mole percent p-phenylene diamine, and the unbalanced stoichiometry is such that a 4.0 percent molar deficit exists for 4,4'-oxydiphthalic anhydride and 8.0 mole percent of phthalic anhydride is used as an endcapper.

Composites, films and adhesives were prepared from the copolyimide. Testing indicated that the copolyimide had a Tg and a melt viscosity which was comparable to LaRC™-IA. However, when the copolyimide was further cured at 350°, 371° and 400° C., the Tg was unexpectedly higher than LaRC™-IA which had been cured under the same conditions (Table 1).

TABLE 1

| Effect of Cure Temperature on Tg | | |
| --- | --- | --- |
| Cure Temperature | Modified System | Tg, °C. |
| 300° C. | LaRC ™-IA | 233.0 |
|  | 10% PMDA | 235.0 |
|  | 10% p-PDA | 236.8 |
|  | 25% PMDA | 237.2 |
|  | 25% p-PDA | 239.9 |
| 350° C. | LaRC ™-IA | 233.0 |
|  | 10% PMDA | 238.6 |
|  | 10% p-PDA | 240.2 |
|  | 25% PMDA | 243.0 |
|  | 25% p-PDA | 242.5 |
| 371° C. | LaRC ™-IA | 231.0 |
|  | 10% PMDA | 240.2 |
|  | 10% p-PDA | 242.3 |

TABLE 1-continued

| Effect of Cure Temperature on Tg | | |
| --- | --- | --- |
| Cure Temperature | Modified System | Tg, °C. |
|  | 25% PMDA | 253.3 |
|  | 25% p-PDA | 250.4 |
| 400° C. | LaRC ™-IA | 240.2 |
|  | 10% PMDA | 241.0 |
|  | 10% p-PDA | 268.0 |
|  | 25% PMDA | 276.1 |
|  | 25% p-PDA | 268.9 |

Solvent resistance testing showed that a film of the copolyimide remained creasable in acetone, methylethyl ketone, and toluene as did LaRC™-IA and the copolyimide of Tamai et al. but when subjected to DMAc and chloroform, there was improved solvent resistance for the copolyimide which had been further cured at 350°, 371° and 400° C. as compared to LaRC™-IA and the copolyimide of Tamai et al. which had been cured under the same conditions (Table 2).

TABLE 2

| Solvent Resistance Testing | | | |
| --- | --- | --- | --- |
| Cure Temperature | Modified System | DMAc | Chloroform |
| 300° C. | LaRC ™-IA | ++ | ++ |
|  | 3% PMDA | ++ | ++ |
|  | 3% p-PDA | ++ | ++ |
|  | 6% PMDA | ++ | ++ |
|  | 6% p-PDA | ++ | ++ |
|  | 10% PMDA | ++ | ++ |
|  | 10% p-PDA | + | ++ |
|  | 25% PMDA | ++ | + |
|  | 25% p-PDA | + | ++ |
| 350° C. | LaRC ™-IA | ++ | ++ |
|  | 3% PMDA | + | ++ |
|  | 3% p-PDA | ++ | ++ |
|  | 6% PMDA | + | ++ |
|  | 6% p-PDA | ++ | ++ |
|  | 10% PMDA | + | ++ |
|  | 10% p-PDA | − | + |
|  | 25% PMDA | + | + |
|  | 25% p-PDA | + | + |
| 371° C. | LaRC ™-IA | ++ | ++ |
|  | 3% PMDA | + | + |
|  | 3% p-PDA | ++ | ++ |
|  | 6% PMDA | + | + |
|  | 6% p-PDA | ++ | ++ |
|  | 10% PMDA | + | + |
|  | 10% p-PDA | − | − |
|  | 25% PMDA | + | + |
|  | 25% p-PDA | + | − |
| 400° C. | LaRC ™-IA | + | + |
|  | 3% PMDA | − | − |
|  | 3% p-PDA | + | + |
|  | 6% PMDA | − | − |
|  | 6% p-PDA | − | − |
|  | 10% PMDA | + | + |
|  | 10% p-PDA | + | + |
|  | 25% PMDA | + | + |
|  | 25% p-PDA | − | − |

(−) SIGNIFIES CREASABLE FILM
(+) SIGNIFIES THAT FILM BREAKS AFTER IMMERSION AND CREASING
(++) SIGNIFIES THAT FILM BREAKS INTO TWO PIECES WITHIN ONE MINUTE OF IMMERSION

The following are examples which illustrate the preparation and use of a solvent resistant copolyimide for applications such as composites, films and adhesives. These examples are merely illustrative and intended to enable those skilled in the art to practice the invention in all of the embodiments flowing therefrom, and do not in any way limit the scope of the invention as defined by the claims.

EXAMPLES

The polymers of examples 1–4 were prepared for comparative purposes using the monomers disclosed by Tamai et al. in combination with the procedure of the present invention.

Example 1

For comparative purposes, a mixture of 4,4'-oxydiphthalic anhydride (ODPA) (29.1898g, 0.0941 mole) and pyromellitic dianhydride (PMDA) (0.6347g, 0.0029 mole) was added to a stirred solution of 3,4'-oxydianiline (3,4'-ODA) (20.0242g, 0.1 mole) in gamma-butyrolactone (GBL) ( 228.4 ml), to provide a concentration of 15% solids by weight at ambient temperature. The mixture was stirred for three hours and the phthalic anhydride endcapper (0.9776g, 0.0066 mole) was added to control the molecular weight. Stirring was continued overnight. The polyamic acid solution mixture became viscous. A portion of this polyamic acid solution (approximately 25 grams) was removed and was reserved for film casting. Glacial acetic acid (GAA) (27 ml, 10% of the total solvent weight) was added to the remaining resin and the reaction mixture was heated to 120° C. and maintained at that temperature overnight in order to imidize the polyamic acid. It was observed that the polyimide began to precipitate from the solution after one hour at 120° C. The precipitate was collected by filtration, stirred in hot ethanol for 2 hours, filtered and dried under vacuum at 180° C. overnight.

Differential scanning calorimetry (DSC) testing showed that the copolyimide had a melt temperature of 297.1° C., an enthalpy of 35.7 J/g and a Tg of 230.3° C. (These properties are comparable to LaRC™-IA.)

A film was cast from the portion of the polyamic acid solution which was reserved prior to imidization. The polyamic acid solution was cast onto a glass plate using a 20 mil doctor blade and was air dried in a dust-free, low humidity chamber until it was tack free. The tack-free film was cured in a forced-air oven at 100°, 200° and 300° C. for one hour at each temperature. Portions of the film were further cured at 350°, 371° and 400° C. After curing at each temperature, a sufficient sample was removed for solvent resistance testing and thermal analysis.

Solvent resistance testing was conducted by bending a strip of film and immersing it in either acetone, methyl ethyl ketone, toluene, DMAc or chloroform for a period of one minute. Results from this testing are provided in Table 2.

Example 2

A mixture of ODPA (28.6867 g, 0.0912 mole) and PMDA (1.2695 g, 0.0058 mole) was added to a stirred solution of 3,4'-ODA (20.0242g, 0.1 mole) in GBL (228 ml) to provide a concentration of 15% solids by weight. The solution was stirred for three hours and phthalic anhydride (0.9776g, 0.0066 mole) was added as an endcapper to control the molecular weight. Stirring was continued overnight. The solution mixture became viscous and a portion of the polyamic acid solution was reserved for casting a film. Glacial acetic acid (27 ml) was added to the remaining resin and the reaction mixture was heated to 120° C. and maintained at that temperature overnight. It was observed that the polyimide powder began to precipitate from the solution after heating for one hour at 120° C. The precipitated polyimide was collected by filtration, stirred in hot ethanol for 2 hours, filtered and dried under vacuum at 180° C. overnight. The resulting polyimide powder had a Tg of 230.7° C., a melt endotherm (Tm) of 285.3° C. and an enthalpy of 39.7 J/g. The melt viscosity at 330° C. was 66,674 poise. The solvent resistance testing results are provided in Table 2.

Example 3

The procedure of Example 1 was followed to yield a copolyimide comprising a mixture of ODPA (27.0834 g, 0.0873 mole), PMDA (2.1158 g, 0.0097 mole) and 3,4'-ODA (20.0242 g, 0.1 mole)in GBL (177.5 ml) to provide a concentration of 15% solids by weight. Phthalic anhydride (0.9776 g, 0.0066 mole) was used as an endcapper and GAA (27 ml) was used as a dehydrating agent. The resulting copolyimide had a TG of 232.5° C., a Tm of 307.0° C. and an enthalpy of 33.1 J/g. The melt viscosity at 330° C. was 79,498 poise. The solvent resistance is provided in Table 2.

Example 4

The procedure of example 1 was followed to yield a copolyimide comprising ODPA (22.5695 g, 0.0728 mole), PMDA (5.2894 g, 0.0243 mole) and 3,4'-ODA (20.0242 g, 0.1 mole)in GBL (221 ml) to provide a concentration of 15% solids by weight. Phthalic anhydride (0.9776 g, 0.0066 mole) was used as an endcapper and GAA (27 ml) was added as a dehydrating agent. The resulting polyimide powder had a Tg of 233.2° C., a Tm of 287.0° C. and an enthalpy of 24.7J/g. The melt viscosity at 330° C. was 81,464 poise. The solvent resistance is provided in Table 2.

Example 5

A mixture of p-phenylene diamine (p-PDA) (0.3244 g, 0.003 mole) and 3,4'-ODA (19.4235 g, 0.097 moles) was dissolved in GBL (259 ml). Next, ODPA (30.0926 g, 0.097 moles) was added at ambient condition and stirring was continued for 3 hours. The endcapper, phthalic anhydride (0.9776 g, 0.0066 mole) was added and stirring was continued overnight to allow for the formation of the polyamic acid. A portion of the polyamic acid solution was reserved for film casting. GAA (27 ml) was added to the remaining polyamic acid solution and the mixture was heated to approximately 120° C. The procedure of example 1 was followed for testing the solid polyimide and the cast film. The resulting polyimide powder had a Tg of 230.3° C., a Tm of 297.1° C., an enthalpy of 35.7 J/g and melt viscosity of 61,064 poise at 330° C. The results from the solvent resistance testing are provided in Table 2.

Example 6

The procedure of example 1 was followed to prepare a copolyimide comprising ODPA (30.0926 g, 0.097 mole), 3,4'-ODA (18.8227 g, 0.094 mole), and p-PDA (0.6489 g, 0.006 mole) in GBL (228 ml) to provide a 15% solids by weight solution. Phthalic anhydride (0.9776 g, 0.0066 mole) was added as an endcapper and GAA (27 ml) was added as a dehydrating agent. The resulting polyimide powder had a Tg of 230.7° C., a Tm of 285.6° C. and an enthalpy of 33.4 J/g. The melt viscosity at 330° C. was 70,278 poise. The films cured at 371° and 400° C. had improved solvent resistance (Table 2).

Example 7

The procedure of example 1 was followed to provide a copolyimide comprising ODPA (18.0556 g, 0.058 mole), 3,4'-ODA (10.8131 g, 0.054 mole), and p-PDA (0.6489 g, 0.006 mole)in N-methyl pyrrolidinone (NMP) (150 ml). The resulting polyimide powder had a Tg of 237.8° C., a Tm of 297.8° C. and an enthalpy of 46.3 J/g. The melt viscosity at 330° C. was 79,498 poise. The film had a tensile modulus of 426.8 Ksi and the solvent resistance was excellent (Table 2).

Example 8

The procedure of example 1 was followed to prepare a copolyimide comprising ODPA (30.0926 g, 0.097 mole), 3,4'-ODA (15.0182 g, 0.075 mole), p-PDA (2.7036 g, 0.025 mole). Phthalic anhydride (0.9776 g, 0.0066 mole), GAA (26 ml) and GBL (216 ml) were charged. The resulting copolyimide had a Tg of 234.6° C., a Tm of 278.7° C. and an enthalpy of 26.1 J/g. The melt viscosity at 330° C. was 81,464 poise. The films had good solvent resistance (Table 2) and the tensile modulus was 4576.8 Ksi. The Tg for films cured at 371° and 400° C. was 250.4° C. and 268.9° C., respectively (Table 1).

Example 9

The procedure of example 1 was followed to provide a copolyamic acid resin comprising ODPA (655.2121 g, 2.112 mole), 3,4'-ODA (396.4792 g, 1.98 mole), and p-PDA (23.7917 g, 0.22 mole), in NMP (1920 ml) to provide a 35.7% solids by weight solution. Phthalic anhydride (26.0691 g, 0.176 mole) was added as an endcapper. The resulting polyamic acid had an inherent viscosity of 0.41 dL/g and Brookfield viscosity of 163,000 cps.

Example 10

The copolyamic acid resin of example 9 was used to prepare composite laminates. The unidirectional prepreg was fabricated by both standard drum winding procedures and a multi-purpose tape machine. The prepreg was B-staged first in an oven set at 250° C. for one hour, and then at in a press set at 315° C. for one hour without pressure. After heating at 31 5° C. for one hour, 1.72 MPa (250 psi) pressure was applied for 30 minutes. The temperature was increased to 350° C. and pressure applied for one hour to yield a composite laminate. The composite was cooled in the press and the pressure was released when the temperature was below 200° C. The composites were tested to determine their physical properties using test methods which are known to those skilled in the art. Results from this testing are given in Tables 3 and 4.

TABLE 3

| Mechanical Properties | Testing Condition, °C. | IM7/ LaRC ™-IA | Example 9 |
|---|---|---|---|
| SBS Strength, Ksi | 25 | 16.70 | 16.08 |
|  | 93 | 14.99 | 12.78 |
|  | 150 | 13.86 | 9.83 |
|  | 177 | 8.32 | 8.03 |
| 0° Flexural Strength, Ksi | 25 | 195.6 | 216.1 |
|  | 93 | 165.0 | 175.9 |
|  | 150 | 139.8 | 133.6 |
|  | 177 | 131.8 | 106.2 |
| 0° Flexural Modulus, Msi | 25 | 12.3 | 18.9 |
|  | 93 | 12.0 | 16.1 |
|  | 150 | 12.9 | 16.5 |
|  | 177 | 13.2 | 15.3 |
| 0° IITRI Compression |  |  |  |
| Strength, Ksi | 25 | 179.9 | 169.7 |
| Modulus, Msi | 25 | 20.0 | 23.8 |
| CAI Strength, Ksi | 25 | 44.3 | 41.4 |
| Modulus, Msi | 25 | 7.9 | 7.5 |
| OHC Strength, Ksi | 25 | 45.8 | 46.1 |
|  | 177 | 33.0 | 34.3 |

TABLE 4

| TestType | Layup (0°/±45°/90°) | Strength (ksi) 77° F./Dry | Strength (ksi) 350° F./Wet |
|---|---|---|---|
| Open Hole Compression | 58/34/8 | 64.4 | 39.7 |
| Strength | 42/50/8 | 54.3 | 39.4 |
|  | 25/50/25 | 49.0 | 27.7 |
| Compression After Impact Strength | 25/50/25 | 43.5 |  |
| Open Hole Compression Strength After Isothermal Aging at 350° F. for 1000 hours and Thermal Cycling From −67° F. to 350° F. | 58/34/8 (10 cycles) | Data Not Available | 47.0 |
|  | 58/34/8 (100 cycles) | Data Not Available | 41.6 |
| Interlaminar Shear Strength | Unidirectional | 20.2 | 3.6 |

Example 11

The copolyamic acid resin of example 9 was used to prepare adhesive specimens. The resin was diluted to 25% solids by weight and was brush coated onto a 112 E-glass cloth having an A-1100 finish to form an adhesive tape. After each coat was applied, the tape was placed into a forced-air oven and heated for one hour each at 100°, 175° and 225° C. The copolyamic acid resin was reapplied to the cloth until the thickness was approximately 13 mil. The tape was heated to obtain less than 2% volatiles. The prepared adhesive tape was used to bond lap shear specimens with titanium adherends. The specimens were heated at 325° C. and 25 psi for one hour in order for bonding to take pace. The specimens were tested at various temperatures using conventional test methods known to those skilled in the art. The results from this testing are given in Table 5.

TABLE 5

| Test Condition | LaRC ™-IA Strength (psi) | Example 9 Strength (psi) |
|---|---|---|
| 23° C. | 4437 | 4952 |
| 150° C. | 4554 | 4245 |
| 177° C. | 3833 | 3872 |

TABLE 5-continued

| Test Condition | LaRC ™-IA Strength (psi) | Example 9 Strength (psi) |
|---|---|---|
| 204° C. | 2104 | 2700 |

What is claimed is:

1. A solvent resistant copolyimide comprising the following repeat units:

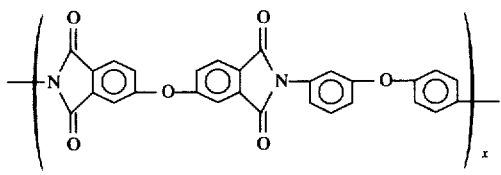

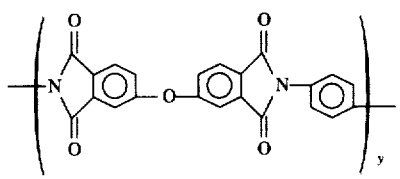

wherein x is 75 to 90 mole percent of the copolyimide and y is 10 to 25 mole percent of the copolyimide.

2. A solvent resistant copolyimide prepared by reacting 4,4'-oxydiphthalic anhydride with a diamine blend comprising, based on the total amount of the diamine blend, about 75 to 90 mole percent of 3,4'-oxydianiline and about 10 to 25 mole percent of p-phenylene diamine and wherein the copolyimide has been endcapped with up to about 10 mole percent of a monofunctional aromatic anhydride and having unbalanced stoichiometry such that a molar deficit in the 4,4'-oxydiphthalic anhydride is compensated with twice the molar amount of the monofunctional aromatic anhydride.

3. A solvent resistant copolyimide of claim 2, wherein the diamine blend comprises, based on the total amount of the diamine blend, 90 mole percent of 3,4'-oxydianiline and 10 mole percent p-phenylene diamine.

4. A solvent resistant copolyimide of claim 2, wherein the monofunctional aromatic anhydride is phthalic anhydride.

5. A solvent resistant copolyimide of claim 2, wherein the unbalanced stoichiometry is such that a 2.5 to 5.0 percent molar deficit exists for 4,4'-oxydiphthalic anhydride and 5.0 to 10.0 mole percent of phthalic anhydride is used as an endcapper.

6. A solvent resistant copolyimide of claim 3, wherein the unbalanced stoichiometry is such that a 2.5 to 5.0 percent molar deficit exists for 4,4'-oxydiphthalic anhydride and 5.0 to 10.0 mole percent of phthalic anhydride is used as an endcapper.

7. A solvent resistant copolyimide of claim 6, wherein the unbalanced stoichiometry is such that a 4.0 percent molar deficit exists for 4,4'-oxydiphthalic anhydride and 8.0 mole percent of phthalic anhydride is used as an endcapper.

8. A composite prepared from the solvent resistant copolyimide of claim 1.

9. A film prepared from the solvent resistant copolyimide of claim 1.

10. An adhesive prepared from the solvent resistant copolyimide of claim 1.

11. A composite prepared from the solvent resistant copolyimide of claim 2.

12. A film prepared from the solvent resistant copolyimide of claim 2.

13. An adhesive prepared from the solvent resistant copolyimide of claim 2.

14. A composite prepared from the solvent resistant copolyimide of claim 7.

15. A film prepared from the solvent resistant copolyimide of claim 7.

16. An adhesive prepared from the solvent resistant copolyimide of claim 7.

* * * * *